3,421,584
GROUTING, PLUGGING, AND CONSOLIDATING METHOD
Louis H. Eilers and Christ F. Parks, Tulsa, Okla., assignors to The Dow Chemical Company, Midland, Mich., a corporation of Delaware
No Drawing. Filed Mar. 23, 1967, Ser. No. 625,324
U.S. Cl. 166—33    7 Claims
Int. Cl. E21b 33/13; C08f 45/24

---

ABSTRACT OF THE DISCLOSURE

A fluid gelable composition comprising water, a water-soluble polymer, a cross-linking agent for the polymer, a hydrogen ion source when in an aqueous solution, and a sodium silicate, in specified amounts, to make a flowable liquid composition, and method of plugging voids, sealing off passageways, or consolidating incompetent earthen or terranean formations by employing the composition in such void, passageway or interstices of the formation.

---

The invention provides an improved composition and method: of stopping fluid flow through passageways; of filling of cavities, voids or other openings; of forcing apart or otherwise repositioning, as desired, previously positioned structural members; of rendering materials less permeable to fluids; of reinforcing loose materials and insufficiently secure supports; and of adhering unconsolidated or incompetent materials together.

The invention has particular application to sealing or closing of passageways, within or in contact with a face of a geologic formation, against the passage of fluid therethrough. This objective is attained by emplacing in accordance with the need, the composition of the invention, e.g. by squeezing or forceably injecting the required composition between the exposed surface of the formation and a surface of wood, concrete, metal or similar material, as in grouting, to raise or otherwise reposition slabs, floors, platform, roadways, courtyards or the like, or to fill and plug a selected cross-section of the space existing between two surfaces as in a fracture or fissure in an earthen formation or between the face of an earthen formation and a well casing, tunnel shaft, or shoring, and thereby inhibit the passageway of fluids through the passageway.

The term "terranean" is sometimes used herein to refer to both surface and subsurface geologic formations.

It may be used to consolidate gravel, sand, broken stone, rubble, or friable shale or slate, or the like.

The invention encompasses particularly an improved plugging composition and method of use employing the composition by which especially strong bonds are formed between such materials as earth, rock, or concrete.

The invention may be practiced in any plugging, grouting, or consolidating operation wherein the force to which it will be subjected, when set, is not in excess of about 1,000 pounds per square inch and the temperature is between about 0° and 100° C.

The composition of the invention comprises water, a selected water-soluble particulated polymer, which is stable in an aqueous acid solution at a pH value of 4 or less, a pH control agent to yield hydrogen ions in a solution, a cross-linking agent for the polymer, and a sodium silicate.

The polymer employed is one having sufficient hydrophilic groups attached to the carbon atoms of the hydrocarbon groups of the polymer chain to offset, substantially, the organophilic nature of the hydrocarbon groups. In general, the acceptable polymers for the invention are those prepared by polymerizing one or more monomers having ethylenic groups. The polymer is a water-soluble or water-dispersible (colloid forming) homopolymer or copolymer.

Illustrative of groups which impart hydrophilic properties to the polymer, to be acceptable in the practice of the invention, are sulfonate, carboxylate, hydrolyzable carboxamides, phosphates, esters, amines and ammonium compounds including quaternary ammonium derivatives, ethers, hydroxyl, acetyl, ketal, and lactam groups, on the condition as aforestated, that the hydrophilic moieties are present, of sufficient activity, and in sufficient frequency to result in the polymer being uniformly dispersed in the aqueous acid.

The polymers useful in the invention are characterized by a relatively high molecular weight. A polymer, accordingly, is considered to be acceptable, providing it has the hydrophilic properties, as set out above, which has a molecular weight such that a 2 percent aqueous solution thereof has a viscosity of at least about 10 centipoises measured by a Brookfield Viscometer at ambient temperature.

In general, a water-soluble polymer is satisfactory which has an average weight of between about 10,000 and about 10,000,000.

The amount of polymer to employ is not highly critical so long as at least an effective amount is present, and the amount is not such as to result in a viscosity so great as to cause difficulties of emplacement. The optimum amount to use in a specific treatment depends upon conditions, e.g. rate of gel desired at the ambient temperature and the nature of the contemplated use in general. Such amount may be quickly ascertained by preparing and observing a test composition. The effective amount can be very small. Beneficial results may be observed by employing as little polymer as 0.01 percent by weight based on the final aqueous acidified polymer-silicate composition used. As afore-indicated, the upper limit of the amount of polymer to employ is largely guided by the resulting increased viscosity. When the viscosity exceeds about 1,000 centipoises, difficulties associated with emplacement of the composition usually appear. An amount of polymer which meets most operational needs contemplated by the method of the invention is that falling within the limits of between about 0.04% and 2.0%, usually between about 0.1% and 1.0% based on the weight of the aqueous acid polymer-silicate compostion.

Specific polymers for use in the practice of the invention include, but are not limited to, homopolymers and copolymers prepared by polymerizing one or more of the following monomers: acrylamide, vinyltoluene sulfonate, vinylbenzyl sulfonate, styrene sulfonate, vinyloxazolidinone, methyl- or ethyl-substituted oxazolidinones, ethylene oxide, vinylpyrrolidone, vinylmorpholinone, vinyl alcohols, and mixtures thereof and copolymers of at least one or the above monomers and/or vinyl acetate copolymerized with one of maleic anhydride of a maleic anhydride half amide.

The polymers may be linear or lightly crosslinked. When lightly cross-linked polymers are employed, cross-linking must be limited to insure a sufficient hydrophilic nature, as above explained. When such cross-linked polymer is optionally employed in the practice of the invention, it is not to be confused with the in situ cross-linking agent required by the invention.

The methods of preparing the polymer, for use in making the fluid gelable composition of the invention, largely follow one or two common practices or a combination of both. One such practice is to dissolve the monomer or monomers in water containing an effective amount, e.g. 0.1 to 1.0 percent of an initiator such as benzoyl peroxide or azoisobutyronitrile, at room temperature or somewhat above whereby a polymer forms, which can be separated by known physical techniques, e.g. filtering or centrifuging. Mere drying alone may be sufficient. It may be desirable to grind the polymer to a more desirable particle size.

The other such practice is to subject the monomer, preferably in an aqueous solution, to irradiation, e.g. that provided by an electron accelerator or an isotopic gamma radiation source, e.g. cesium 135 or cobalt 60. A combination of free-radical polymerization and irradiation may also be employed. The polymer so made is then separated from the aqueous reaction medium, usually by drying.

In the practice of the invention the polymer, so prepared, is added to the acidified water. The particle size of the polymer is unimportant except to the extent that when it is of an intermediate size, it usually disperses easier than when it is either of an extremely fine or of extremely coarse size.

Any cross-linking agent (which is stable in the aqueous acid solution) for in situ cross-linking of the polymer is one that has a solubility in water, at about 25° C., of at least about 0.01% may be employed.

The amount of such cross-linking agent varies, as will be better understood from a clearer comprehension of the following material descriptive of the inventive concept. Generally speaking, from about .05 to about 5.0 percent, usually from 0.1 to 1.0 percent, by weight of polymer present, is employed so long as at least sufficient agent is present to provide at least one cross-link per polymer molecule.

The cross-linking agent may be a divalent or polyvalent inorganic salt or an organic cross-linking agent such as formaldehyde, glyoxal, N,N'-methylenebisacrylamide, divinylbenzene, diallyl, or divinyl ether or ethylene glycol. Methods of cross-linking monomers of the nature of acrylamide with formaldeyde or glyoxal are known, e.g. as described in Water-Soluble Resins, by Davidson and Sittig, pages 158 and 159.

Among the inorganic salts to employ are the water-soluble halides, sulfates, acetates, formates, phosphates, and nitrates of any of Fe, Zn, Al, Zr, or Ti, except those showing insufficient solubility. The hydrates of the above named salts are often more readily available and are quite satisfactory for use in the invention. Combinations of cross-linking agents may advantageously be employed, e.g. $Al_2(SO_4)_3$ with other inorganic salts and/or organic cross-linking agents. Preference is given to ferric sulphate and aluminum sulphate, either singly or in mixtures thereof.

The required cross-linking agent, selected, depends to some extent upon the polymer present. If the polymer is anionic in nature, i.e. contains groups such as sulfonate, carboxylate, or salt groups, the cross-linking agent can be a polyvalent metal cation which forms hydroxyl bonds at the existing pH value of the composition, viz. 0 to 4. Fritz Ephraim Inorganic Chemistry by Thorne and Roberts, published by Guerney and Jackson, London (1948), page 463, contains helpful discussions on the identification of polyvalent metal ions that form such hydroxyl bonds. Another reference which contains discussions on the preparation of this type of polymer is the Encyclopedia of Polymer Science and Technology, vol. 4, pages 331 to 414, especially pages 354, 372, 375, and 384, published by Interscience Publishers (1966).

Acrylamide polymers are quite suitable in the practice of the invention. These include the homopolymer, copolymers and lightly cross-linked polymers employing acrylamide in the monomeric mixture which copolymers are sufficiently water-soluble or water-dispersible.

The relative proportions of the polymer and cross-linking agent in the aqueous solution vary, dependent upon such factors as the permeability of the material to be sealed, the temperatures, and the particular polymer employed. Having been appraised of the inventive concept, judicious selection of the ingredients are then well within the knowledge of the artisan in the technology or trade which is concerned with sealing off openings. The conditions of pH value, uniform dispersion of polymer, and controlled gelation period must be met for any given grouting, plugging, or consolidation job.

The sodium silicate employed may be any of those available which includes those having a molar ratio of $SiO_2/Na_2O$ of 1 to 4 particularly those composed of between 2 and 4 moles of $SiO_2$ per mole of $Na_2O$. An aqueous solution of the sodium silicate is usually used. Acceptable sodium silicates are discussed in the literature, e.g. in the Reimer U.S. Patents 2,207,759 and 2,330,145.

The acid employed may be any acid having an ionization constant in water of at least about $1 \times 10^{-5}$, e.g. hydrochloric, sulfuric, nitric, sulfonic, phosphoric, acetic, or formic to impart a pH value of not greater than 4, preferably at about 2.5.

At a pH of about 2.5, the gelation rate of the sodium silicate system is at its slowest. Below this pH value, the gelation rate increases as the pH decreases to a pH value of 0. Above a pH value of about 2.5, the rate of gelation increases as the pH value increases to a pH of about 4. Between a pH of about 4 and 7, instantaneous gelation usually occurs. It is for this reason that mixing is normally accomplished by adding an aqueous sodium silicate solution to an aqueous acid solution. Acid concentrations thus are usable as a means of controlling the rate of gelation. Temperature also has an important bearing on the setting rate. The higher the temperature of the system, the faster the gelation occurs. The silicate system sets slowest at the lowest temperatures. Thus, both pH value and temperature affect the setting conditions and are controlled to obtain a desirable setting rate.

It is preferred, that the pH value of the aqueous polymer solution may be first adjusted by addition of acid and thereafter the silicate solution admixed therewith. The mixing required may be attained by any of the usual types of mixing apparatus, e.g. impeller, rotating barrel, or agitator type, to result in a well mixed composition.

The amount of silicate to employ is usually that amount which disperses readily in the aqueous acid solution. Gelation rate is best controlled by varying the amount of acid. If the composition is to be emplaced in a geologic formation wherein formation waters have a relatively high pH as in carbonate formations, then a relatively small amount of sodium silicate may be employed but usually more acid is employed since the pH of the composition will rise faster as a result of contact with such formation waters. The amount of sodium silicate employed can, therefore, remain substantially unchanged. However, the sodium silicate is sometimes varied since the higher the concentration (up to maximum solubility) increases the strength of the set material. In the presence of neutral or acid waters, such as exist in formations in the vicinity of old coal mines and other sulfur-containing formations, then a higher concentration of sodium silicate (and usually less acid) is employed in the composition.

The amount of silicate, therefore, to employ is varied; 2 to 8 percent thereof by weight of the composition is satisfactory. More usually between 4 and 8 percent is used.

Ordinary well water, tap water, or stream water may be employed as well as deionized or distilled water. Where especially hard waters, brackish waters, or acid waters are employed, the effects of dissolved salts or unusual pH values may advisedly be considered and adjustment in the cross-linking agent, acid, or sodium silicate made accordingly.

The use to be made of the composition is an important consideration to bear in mind in its specific preparation. It it is to be used to fill a relatively large void, the composition is preferably more viscous and of a relatively fast gel. Viscosity is increased by employing a higher polymer concentration. If the composition is to be used to fill a hairline type fracture, then a less viscous and a slower gel is recommended, accordingly a lower polymer concentration and a pH value approaching 2.5 is employed. It it is to be used to consolidate an incompetent or loose earthen formation, then a relatively thin slowgelling composition (described sometimes as of water-like consistency) may be desired. In many instances, the presence in the composition of fluid-loss control additives is helpful. These are usually very finely pulverized substantially inert materials (of about 1 micron and preferably less in average size) e.g. silica flour, pumice, clay, or the like, in amounts of up to as much as 30 to 40 percent by weight of the composition.

In the practice of the invention, a composition of the nature of that described above is prepared and emplaced as a grouting, reinforcing, plugging, or cementing material as desired. The composition may be premixed and then conveyed to the locus of use. Alternately, the ingredients may be mixed by a confluence of separate flow lines leading from a source of each ingredient into a common line which in turn leads to the place of ultimate use where the ingredients intermix, to form a substantially uniform mixture during transit, which after emplacement gels and solidifies.

The following tests were conducted to demonstrate the attainment of the objectives of the invention. In some tests, a minor proportion of pulverized oyster shell was employed with a major proportion of sand to stimulate a calcium carbonate-containing, predominantly sandstone, formation. The tests identified by letters were performed for purposes of comparison; those identified by numbers were performed to illustrate the practice of the invention.

SERIES 1

Tests A, B, and C

The comparative tests of this series were conducted by admixing two solutions together. One was an aqueous solution of a sodium silicate (3.22 $SiO_2$:1 $Na_2O$) of a specific gravity of 1.115 and the other, an aqueous solution of HCl having a specific gravity which varied between about 1.05 and 1.08. The so prepared mixture was transferred to a 5-foot long section of 2-inch diameter steel pipe, maintained in a position inclined about 30° from the horizontal, which had previously been filled either with 20 to 40 mesh sand only or with 20:1 or 10:1 by volume proportions of an intermixture of such sand and pulverized oyster shell, respectively (large $CaCO_3$) of about the same mesh size. After the composition in the pipe had gelled, the yield pressure and permeability of the resulting material were obtained. The pressure necessary to force a liquid through or past the gelled composition was taken as the yield pressure. Permeability was ascertained according to the standard test for use in rock formation samples. The results are shown in Table I.

TABLE I.—PART 1

| Test identification | Nature of earthen material being consolidated | Gel time in minutes | Yield pressure in p.s.i. | Permeability in millidarcys |
|---|---|---|---|---|
| A | Sand | 1,200 | 2,500 | 6 |
| B | Sand containing 5% by weight $CaCO_3$ | 2 | 500 | 205 |
| C | Sand containing 10% by weight $CaCO_3$ | 1 | 500 | 270 |

SERIES 2

Examples 1 to 9

The examples of this series were conducted in the same way as were the comparative tests except that both a linear polyacrylamide, and $Al_2(SO_4)_3$, as the cross-linking agent for the polymer according to the invention were present. Amounts of each ingredient used and the resulting yield pressure, gel time, and permeability are shown in Table II.

TABLE II

| Test identification | Percent by weight of composition of— | | Nature of earthen material being consolidated | Gel time in minutes | Yield pressure in p.s.i. | Permeability in millidarcys |
|---|---|---|---|---|---|---|
| | Polymer | $Al_2(SO_4)_3.18 H_2O$ | | | | |
| 1 | 0.2 | 0.1 | Sand only | *1,200 | 3,500 | 1 |
| 2 | 0.2 | 0.1 | Sand and 5% $CaCO_3$ | 1 | 2,500 | 8 |
| 3 | 0.1 | 0.05 | Sand and 10% $CaCO_3$ | 1 | 2,000 | 2.5 |
| 4 | 0.07 | 0.03 | Sand only | 400–1,400 | 3,000 | 1.5 |
| 5 | 0.07 | 0.03 | Sand and 5% $CaCO_3$ | 1 | 2,500 | 2.5 |
| 6 | 0.2 | 0 | Sand only | *1,000 | 3,000 | 1.5 |
| 7 | 0.2 | 0 | Sand and 5% $CaCO_3$ | 2 | 1,200 | 75 |
| 8 | 0 | 0.1 | Sand only | *1,000 | 2,000 | 8 |
| 9 | 0 | 0.1 | Sand and 5% $CaCO_3$ | 2 | 500 | 175 |

*Gel time in sand formations is determined by formation temperature and acid strength. The acid portion in these tests had a specific gravity of about 1.07 and room temperature varied between 72 and 76° F.

Reference to Tables I and II shows that the presence of the polymer and the polyvalent metal salt, as the cross-linking agent, increases the yield pressure, yet provides a treated simulated formation of low permeability in comparison to the same material wherein no polymer or salt was present in the aqueous acidic sodium silicate solution.

SERIES 3

Tests D and 10

Tests of this series were run to demonstrate the practice of the invention wherein a fracture or break in a rock formation is plugged. The tests were conducted by diametrically splitting a 2-inch diameter, 10-inch long marble core, spacing apart the thus made semi-cylindrical halves by two plexiglass 0.1-inch spacers, thereby providing a fracture 0.1 x 2 x 10 inches in size. The so assembled unit was placed in a Hassler sleeve apparatus. A pressure of 2000 p.s.i. was applied circumferential to the rubber sleeve to insure that no liquid would pass through the space between the outer circumferential surface edge of the core and the inner face of the sleeve. In communication with the Hassler sleeve, to provide a flow of liquid into one end, through, and out the opposite end of the core, were two vessels which provided two feed liquids, both under pressure. A graduated receiving vessel received the fluid which flowed axially through the core. Flow through the system was controlled by suitable valves.

The comparative test D was conducted for comparative purposes by putting an aqueous solution of sodium silicate, 1.115 specific gravity and a molar ratio of $SiO_2/Na_2O$ of 3.22 in one vessel and a 1.06 specific gravity aqueous solution of HCl in the other vessel. The valves were opened to provide twice the volume flow of the sodium silicate solution as of the HCl solution. The fracture created between the mating faces of the spaced apart semi-cylindrical halves was thus filled with the acidic sodium silicate compositions. The apparatus was then applied to stand for 24 hours and pressure again applied. The pressure necessary to move the gelled material in the fracture was observed and is set forth in Table III.

Example 10 of this series was conducted in a similar manner as the comparative test above but in accordance with the invention wherein 0.15% by weight of polyacrylamide, prepared as described above, and 0.075% by weight of $Al_2(SO_4)_3 \cdot 18H_2O$ were admixed with the acid and water prior to admixture of the sodium silicate. Twice the rate of the sodium silicate over the polymer in acid solution was provided, as above. The fracture was filled with the intermixed polymer, sulfate, and silicate aqueous compositions and then allowed to stand undisturbed for 24 hours, as in the comparative tests, and thereafter tested. The results are also shown in Table III.

TABLE III

| Test identification | 1.115 sp. gr. aqueous Na₂SiO₃ | 1.050 sp. gr. aqueous HCl | Pressure to extrude after gelation |
|---|---|---|---|
| D | 2 parts by weight | 1 part by weight | 50 |
| 10 | 2 parts by weight plus 0.15% by weight polymer. | 1 part by weight plus 0.15% Al₂(SO₄)₃.18 H₂O | 150 |

Reference to the results shown in Table III shows that the presence of the polymer and polyvalent salts, as the cross-linking agent, produces a superior plugging composition in comparison to sodium silicate and aqueous acid composition alone.

SERIES 4

The examples of this series illustrate a field practice of the invention.

Example 11

A major oil company had a waterflood project in which a thief zone having a high permeability was located between two productive zones. Over a period of ten years, many different materials had been utilized in an attempt to achieve diversion from the thief zone, but without success.

The particular water input well involved in this example had a fifty-foot thief zone of extremely high permeability. The thief zone thereof was isolated by packers placed above and below the zone. Twenty-four hundred gallons of diluted aqueous sodium silicate solution, of specific gravity 1.115, were prepared by diluting 675 gallons of approximately 40° Bé water glass (molar ratio of Na₂O:3.22 SiO₂) with 1725 gallons of water. One hundred eighty pounds of linear polyacrylamide of an average molecular weight, between about 1,000,000 and 2,000,000, and containing approximately five percent of the amide groups converted to carboxylate groups, were added and dissolved in the dilute silicate solution.

In a separate tank of approximately 4000 gallons capacity, 1200 gallons of dilute hydrochloric acid of 1.075 specific gravity were prepared. This was inhibited by admixture therewith of 3 gallons of an organic inhibitor as described in U.S. Patent No. 3,077,454. To this was also added 18 pounds of hydrated aluminum sulfate hydrate Al₂(SO₄)₃·18H₂O, which dissolved in the acid.

The 2400 gallons of diluted sodium silicate solution were then admixed with the 1200 gallons of inhibited hydrochloric acid solution containing the dissolved Al₂(SO₄)₃·18H₂O, thus producing a silicic acid solution of 15-centipoise viscosity. Fifteen hundred gallons of this silicic acid solution were injected down the well and back into the 50-foot thief zone interval of the formation by conventional means using a positive displacement piston pump. This was followed by injection of 1600 gallons of the silicic acid solution to which had been added 4 pounds of silica flour per gallon of the solution, 85% of which was finer than 325 mesh. This was followed by the last 500 gallons of the silicic acid solution to which had been added 4 pounds per gallon of silica flour and 1 pound per gallon of 10 to 100 mesh mica flakes. These were displaced from the wellbore by injecting fresh water. The well was then closed in for 24 hours in order for the silicic acid composition to gel and attain good shear strength. Subsequently it was shown that fluid diversion was achieved (i.e. diverted away) from 80% of the thief zone. This shows a high degree of success of the treatment.

Example 12

An injection well in Lea County, N. Mex. was treated by the following procedure. Prior to the treatment, the injection fluid was throttled at the surface so that 100 barrels (42 gallons=1 barrel) of water per day were injected at a pressure of 550 p.s.i. (4.17 bbl./hr. or 0.07 b.p.m.). An offset injection well near the well to be treated was taking 65 barrels of water per day at 1200 p.s.i. pressure at the surface. A tracer survey showed that the well to be treated was losing water into a fracture at 3943 feet, which was 4 feet above the bottom perforation in the well which was at a depth of 3947 feet. The purpose of this treatment was to divert fluid away from the fracture and thereby to establish a more favorable injection profile. Comparison of the injection rate and pressure with the nearby injection well was to be made following the treatment to provide a good comparison for evaluation of the success of the treatment according to the invention.

A solution containing 2000 gallons of sodium silicate having a specific gravity of 1.115 was prepared which contained 30 pounds of linear polyacrylamide having an average molecular weight of between 1,000,000 and 2,000,000 and containing approximately 5% of the carboxamide groups converted to carboxylate groups. In a separate tank was prepared a solution containing 1000 gallons of 17.5% HCl, to provide a specific gravity of 1.087, 3 gallons of an organic corrosion inhibitor of the type described in U.S. 3,077,454, 1 pint of a silicon antifoam agent (Dow Corning Antifoam B) in 2 quarts of 2 Diesel fuel, and 15 pounds of Al₂(SO₄)₃·18H₂O. To determine a satisfactory rate and pressure at which the treating fluid should be injected into the well to be treated, 12 gallons of water were pumped into the well.

The 2000 gallons of sodium silicate solution containing polyacrylamide polymer and the HCl solution containing the dissolved Al₂(SO₄)₃·18H₂O were batch-mixed by using alternate 500-gallon capacity paddle mix tanks. This treating formulation was started down the well tubing at a rate of 1 barrel per minute at a surface pressure of 500 p.s.i. After 10 minutes, a 50 p.s.i. increase in pressure was noted which indicated that the treating fluid had reached the face of the formulation to be treated. Injection was contained at a rate of 1 barrel per minute with an average increase in pressure of 300 p.s.i. per minute. When the injection pressure had reached 1800 p.s.i. (about 35 minutes after first starting the treating formulation down the tubing) the pump rate was decreased to hold the injection pressure at 1800 p.s.i. at the surface of the ground. Approximately 40 minutes after starting to pump the formulation into the tubing, all 60 barrels had been put into the tubing and pumping was ceased. Ten minutes later, 13 barrels of water were pumped into the tubing to displace all of the treating formulation into the formation to be treated. The displacement of the residual treating formulation with the 13 barrels of water required about 15 minutes, after which the well was shut in for a period of 72 hours to allow the treating formulation to set, cure, and develop adequate strength.

The well was then tested and it was found that the injection pressure had increased from 550 to 1250 p.s.i. at an injection rate of 100 barrels of water per day. This injection rate when contrasted with the injection rate and pressure in the nearby injection well, shows the treatment to have been successful.

Having described our invention, what we claim and desire to protect by Letters Patent is:

1. The method of inhibiting fluid flow in terranean formations and of sealing and plugging openings therein by emplacing in the formation the autonomously gelable composition comprising a water-soluble particulate polymer, a hydrogen ion source when in aqueous solution, a water-soluble cross-linking agent for the polymer, a sodium silicate in a mole ratio of SiO₂/Na₂O of from 1.0 to 4.0, and water, said ingredients being present in amounts by weight of between about 0.01 and 2.0 percent of the polymer, sufficient hydrogen ion source to give a pH value of not more than 4 immediately after admixing sufficient salt in the aqueous solution, and balance water to make a flowable composition and retaining a substantial portion of said composition in the formation where fluid flow is desired to be inhibited until it has gelled to a substantially fluid-tight solid.

2. The method of inhibiting fluid flow in terranean formations and of sealing and plugging openings therein by emplacing in the formation the autonomously gelable composition employed in the process of claim 1 but wherein the components of the sodium silicate have a ratio of $SiO_2/Na_2O$ of from 2.0 to 3.5.

3. The method of inhibiting fluid flow in terranean formations and of sealing and plugging openings therein by emplacing in the formation the autonomously gelable composition employed in the method of claim 1 but wherein the polymer employed therein is prepared by polymerizing a monomer selected from the class consisting of acrylamide, vinyltoluene sulfonate, vinylbenzyl sulfonate, styrene sulfonate, vinyloxazolidinone, methyl and ethyl ring-substituted vinyloxazolidinones, ethylene oxide, vinylpyrrolidinone, vinylmorpholinone, vinyl alcohol, mixtures of such monomers, and at least one of such monomers copolymerized with at least one other monomer selected from the class consisting of vinyl acetate, maleic anhydride, and maleic anhydride half amide and retaining a substantial portion of said composition in the formation where fluid flow is desired to be inhibited until it has gelled to a substantially fluid-tight solid.

4. The method of inhibiting fluid flow in terranean formations and of sealing and plugging openings therein by emplacing in the formation an autonomously gelable composition comprising the composition employed in the method of claim 1 but wherein said polymer is selected from the class consisting of acrylamide polymers and hydrolyzed acrylamide polymers and retaining a substantial portion of said composition in the formation where fluid flow is desired to be inhibited until it has gelled to a substantially fluid-tight solid.

5. The method of inhibiting fluid flow in terranean formations and of sealing and plugging openings therein by emplacing in the formation an autonomously gelable composition comprising the composition employed in claim 1 but wherein said cross-linking agent employed in the preparation of said polymer is a polyvalent metal salt selected from the class consisting of water-soluble halides, sulfates, acetates, formates, phosphates, and nitrates of at least one of the metals selected from the class consisting of Fe, Al, Zr, Ti, and Sn.

6. The method of inhibiting fluid flow in terranean formations and of sealing and plugging openings therein by emplacing in the formation an autonomously gelable composition comprising the composition employed in claim 5 but wherein the salt employed in the preparation of the polymer is $Al_2(SO_4)_3$ hydrate and retaining a substantial portion thereof in the formation where fluid flow is desired to be inhibited until it has gelled to a substantially fluid-tight solid.

7. In the method of diverting fluid being injected into an earthen formation from entering, in disproportionately larger quantities into the more accessible channels, fissures, and interstices, the improvement comprising injecting into the formation and depositing in the openings leading to such more accessible channels, fissures and interstices, the autonomously gelable composition comprising a water-soluble particulate polymer, a hydrogen ion source when in aqueous solution, a water-soluble cross-linking agent for the polymer, a sodium silicate in a mole ratio of $SiO_2/Na_2O$ of from 1.0 to 4.0, and water, said ingredients being present in amount by weight of between about 0.01 and 2.0 percent of the polymer, sufficient hydrogen ion source to give a pH value of not more than 4 immediately after admixing sufficient salt in the aqueous solution, and balance water to make a flowable composition, thereby to divert subsequently injected fluid to less accessible channels, voids, and the like passageways of said formation.

References Cited

UNITED STATES PATENTS

| | | | |
|---|---|---|---|
| 3,056,757 | 10/1962 | Rakowitz | 166—33 X |
| 3,116,264 | 12/1963 | Wahl | 166—33 X |
| 3,302,717 | 2/1967 | West et al. | 166—33 |
| 3,306,870 | 2/1967 | Eilers et al. | 166—33 X |
| 3,308,885 | 3/1967 | Sandiford | 166—33 |
| 3,334,689 | 8/1967 | McLaughlin | 166—33 |
| 3,336,979 | 8/1967 | Ingraham et al. | 166—33 |
| 3,353,601 | 11/1967 | Dollarhide et al. | 166—33 |

STEPHEN J. NOVOSAD, *Primary Examiner.*

U.S. Cl. X.R.

166—158, 205; 260—29.6